United States Patent
Xu

(10) Patent No.: US 9,798,425 B2
(45) Date of Patent: Oct. 24, 2017

(54) CAPACITIVE IN-CELL TOUCH PANEL AND DISPLAY DEVICE

(71) Applicant: Shenzhen China Star Optoelectronics Technology Co., Ltd., Shenzhen, Guangdong (CN)

(72) Inventor: Xiangyang Xu, Guangdong (CN)

(73) Assignee: Shenzhen China Star Optoelectronics Technology Co., Ltd., Shenzhen, Guangdong (CN)

( * ) Notice: Subject to any disclaimer, the term of this patent is extended or adjusted under 35 U.S.C. 154(b) by 167 days.

(21) Appl. No.: 14/426,432

(22) PCT Filed: Dec. 10, 2014

(86) PCT No.: PCT/CN2014/093493
§ 371 (c)(1),
(2) Date: Mar. 6, 2015

(87) PCT Pub. No.: WO2016/078172
PCT Pub. Date: May 26, 2016

(65) Prior Publication Data
US 2016/0342236 A1    Nov. 24, 2016

(30) Foreign Application Priority Data
Nov. 20, 2014  (CN) .......................... 2014 1 0667531

(51) Int. Cl.
*G06F 3/044* (2006.01)
*G06F 3/041* (2006.01)
*G02F 1/1333* (2006.01)
*G02F 1/1362* (2006.01)

(52) U.S. Cl.
CPC ............ *G06F 3/044* (2013.01); *G06F 3/0412* (2013.01); *G06F 3/0418* (2013.01); *G02F 1/13338* (2013.01); *G02F 1/136209* (2013.01); *G06F 2203/04103* (2013.01); *G06F 2203/04107* (2013.01); *G06F 2203/04111* (2013.01)

(58) Field of Classification Search
CPC ....................................................... G06F 3/044
USPC .......................................... 345/174; 178/18.06
See application file for complete search history.

(56) References Cited

U.S. PATENT DOCUMENTS

| | | | |
|---|---|---|---|
| 2011/0096017 A1* | 4/2011 | Li | G06F 3/044 345/174 |
| 2016/0026311 A1* | 1/2016 | Wang | G02F 1/1333 345/173 |

* cited by examiner

Primary Examiner — Chad Dicke
(74) Attorney, Agent, or Firm — Andrew C. Cheng

(57) ABSTRACT

Disclosed is a capacitive in-cell touch panel, which includes a substrate and a black matrix disposed on the substrate. The capacitive in-cell touch panel further includes a first capacitive touch layer, an insulation layer, and a second capacitive touch layer. The first capacitive touch layer is formed on the black matrix. The insulation layer is formed on the first capacitive touch layer. The second capacitive touch layer is formed on the second capacitive touch layer and is stacked on and intersects the first capacitive touch layer in a grid form. Also disclosed is a display device.

10 Claims, 3 Drawing Sheets

CAPACITIVE IN-CELL TOUCH PANEL AND DISPLAY DEVICE

CROSS REFERENCE TO RELATED APPLICATIONS

This application claims the priority of Chinese Patent Application No. 201410667531.6, entitled "Capacitive In-Cell Touch Panel and Display Device", filed on Nov. 20, 2014, the disclosure of which is incorporated herein by reference in its entirety.

BACKGROUND OF THE INVENTION

1. Field of the Invention

The present invention relates to the field of liquid crystal displaying technology, and in particular to a capacitive in-cell touch panel and a display device.

2. The Related Arts

With the fast progress of the displaying technology, touch screen panels have been widely prevailing in the living of people. Currently, the touch screen panels are classified, according to the structure thereof, into add-on mode touch panels, on-cell touch panel, and in-cell touch panel. The add-on mode touch panels are made by separately manufacturing a touch panel and a liquid crystal display (LCD) that are then laminated together to form a liquid crystal display with a touch control function. The add-on mode touch panel suffers various disadvantages, such as high manufacturing cost, low light transmittance, and large module thickness. The in-cell touch panels are made by embedding touch electrodes of a touch panel in the interior of a liquid crystal display in order to reduce the overall module thickness and also help reduce the manufacturing cost of the touch panel, making them prevailing the all major panel manufacturers. Heretofore, the in-cell touch panel that is currently known is made by directly adding a capacitive sensor and touch wires on a thin-film transistor (TFT) array substrate; however, adding the capacitive sensor and the touch wires on a conventional TFT array substrate affects the aperture ratio of the TFT array and touch sensitivity and thus reducing the reliability of the touch operation.

SUMMARY OF THE INVENTION

The present invention provides a capacitive in-cell touch panel, which addresses the technical issues of liquid crystal aperture ratio being affected and helps increase touch reliability.

The present invention also provides a display device.

To achieve the above objects, the present invention provides the following technical solutions:

The present invention provides a capacitive in-cell touch panel, which comprises a substrate and a black matrix disposed on the substrate, wherein the capacitive in-cell touch panel further comprises a first capacitive touch layer, an insulation layer, and a second capacitive touch layer. The first capacitive touch layer is formed on the black matrix. The insulation layer is formed on the first capacitive touch layer. The second capacitive touch layer is formed on the second capacitive touch layer to be stacked on and intersecting the first capacitive touch layer in a grid form.

In the above capacitive in-cell touch pane, the first capacitive touch layer comprises a first transparent conductive layer and a first touch detection line, the first transparent conductive layer being formed on the black matrix, the first touch detection line being formed on the first transparent conductive layer.

In the above capacitive in-cell touch pane, the second capacitive touch layer comprises a second transparent conductive layer and a second detection line, the second transparent conductive layer being formed on the insulation layer and having an orthogonal projection cast exactly on the black matrix, the second touch detection line being formed on the second transparent conductive layer.

In the above capacitive in-cell touch pane, the insulation layer is set on and covers the first touch detection line and a portion of the first transparent conductive layer not covered by the first touch detection line.

In the above capacitive in-cell touch pane, the first touch detection line and the first transparent conductive layer generate capacitive detection and the second touch detection line and the second transparent conductive layer generate capacitive detection.

In the above capacitive in-cell touch pane, the first touch detection line casts an orthogonal projection on the first transparent conductive layer that is located within an orthogonal projection of the black matrix; and the second touch detection line casts an orthogonal projection on the second transparent conductive layer that is within an orthogonal projection of the black matrix.

In the above capacitive in-cell touch pane, the first touch detection line extends in a row-wise direction of open areas and the second touch detection line extends in a column-wise direction of the open areas and the first touch detection line and the second touch detection line are stacked on and intersect each other without engaging each other.

In the above capacitive in-cell touch pane, the second touch detection line extends in a row-wise direction of open areas and the first touch detection line extends in a column-wise direction of the open areas and the first touch detection line and the second touch detection line are stacked on and intersect each other without engaging each other.

In the above capacitive in-cell touch pane, the first touch detection line and the second touch detection line are made of metallic materials.

The present invention also provides a display device, which comprises the above-described capacitive in-cell touch panel.

The present invention provides a capacitive in-cell touch panel, which comprises two capacitive sensors at a touch site, namely the stacked and intersecting first capacitive touch layer and second capacitive touch layer, where each layer of capacitive sensor achieves a touch control operation by establishing capacitive coupling between a conductive layer and a signal line to generate a voltage signal. Due to the two-layered arrangement, touch sensitivity is enhanced. Further, the transmitting line and the receiving line of each layer is arranged on the black matrix or has an orthogonal projection exactly located on the black matrix so as to avoid blocking of an open area that affects aperture ratio.

BRIEF DESCRIPTION OF THE DRAWINGS

To more clearly illustrate the technical solutions proposed in the present invention, a brief description of the drawings that are necessary for describing embodiments of the present invention is given below. It is obvious that the drawings that will be described below show only some embodiments of the present invention and for those having ordinary skills of the art, other drawings may also be readily available from these attached drawings without the expense of creative effort and endeavor.

FIG. 1 is a schematic view showing the structure of a capacitive in-cell touch panel according to a preferred embodiment of the present invention.

DETAILED DESCRIPTION OF THE PREFERRED EMBODIMENTS

A clear and complete description will be given to technical solutions of the embodiments of the present invention with reference to the attached drawings of the embodiments of the present invention.

Figure 1:
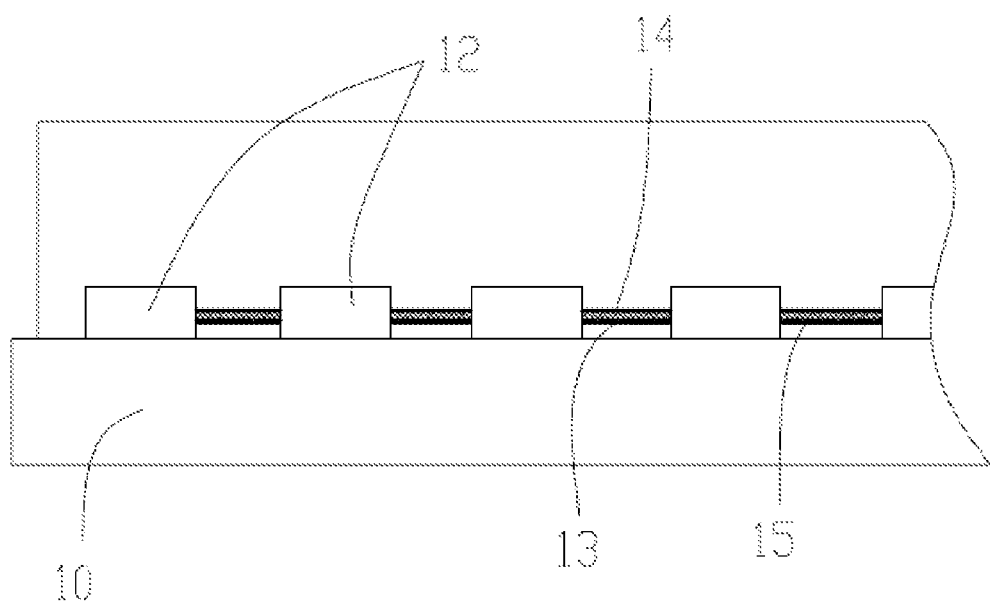
Figure 2:
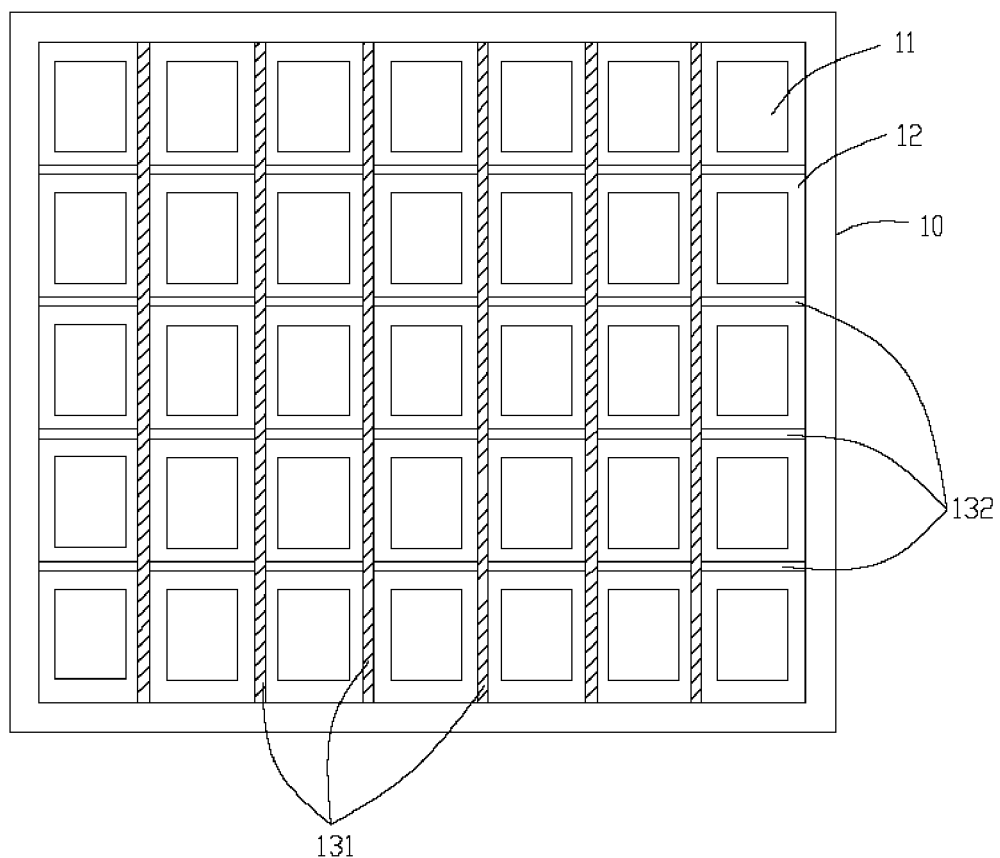
FIG. 2 is a plan view showing the capacitive in-cell touch panel of FIG. 1.

Referring to FIGS. 1 and 2, a preferred embodiment of the present invention provides a capacitive in-cell touch panel, which comprises a substrate 10 and a black matrix 12 disposed on the substrate 10. The capacitive in-cell touch panel further comprises a first capacitive touch layer 13 and a second capacitive touch layer 14. The first capacitive touch layer 13 and the second capacitive touch layer 14 are formed on the black matrix 12 to be stacked on and intersecting each other in a grid form. Further, the first capacitive touch layer 13 and the second capacitive touch layer 14 are isolated from each other by arranging an insulation layer 15 therebetween.

In an embodiment, the substrate 10 is a glass panel with a color filtering function. A liquid crystal panel of a thin-film transistor (TFT) array substrate of the touch panel is arranged on the second capacitive touch layer 14. The black matrix 12 formed on the substrate 10 generally comprises open areas 11 arranged in a matrix and the open areas 11 correspond to effective display zones of pixel units of the TFT array substrate. The black matrix 11 is configured in the form of a grid. After the substrate 10 and the TFT array substrate have been laminated together, the first capacitive touch layer 13 is located closer to a viewer. The capacitive in-cell touch panel provided in the present invention is applicable to a color filter structure wherein a color filter film is arranged opposite to the TFT array substrate and is also applicable to a structure wherein the color filter film is arranged in the TFT array substrate, no limitation in this respect being cast here.

Figure 3:
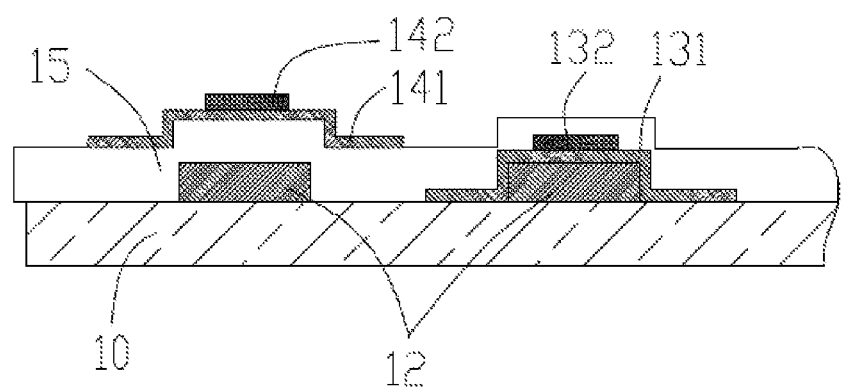
FIG. 3 is a cross-sectional view showing the capacitive in-cell touch panel of FIG. 1.

Referring to FIG. 3, further, the first capacitive touch layer 13 comprises a first transparent conductive layer 131 and a first touch detection line 132. The first transparent conductive layer 132 is formed on the black matrix 12. The first touch detection line 131 is formed on the first transparent conductive layer 132. Specifically, the first transparent conductive layer 131 comprises an indium tin oxide (ITO) transparent conductive film. The first touch detection line 132 is made of a conductive metallic material, such as copper and aluminum, and is preferably copper in the instant embodiment. In other embodiments, the first touch detection line 132 is made of transparent conductive materials.

Further, the insulation layer 15 is set to cover on the first touch detection line 132 and a portion of the first transparent conductive layer 131 that is not covered by the first touch detection line 132. In the instant embodiment, the insulation layer 15 comprises an organic insulation film.

Further, the second capacitive touch layer 14 comprises a second transparent conductive layer 141 and a second touch detection line 142. The second transparent conductive layer 141 is formed on the insulation layer 15 at such a location as to cast an orthogonal projection thereof exactly on the black matrix 12. The second touch detection line 142 is formed on the second transparent conductive layer 141. Specifically, the second transparent conductive layer 141 comprises an ITO transparent conductive film. The second touch detection line 142 is made of a conductive metallic material, such as copper and aluminum and is preferably copper in the instant embodiment. In other embodiments, the second touch detection line 142 is made of transparent conductive materials.

Further, an orthogonal projection cast by the first touch detection line 132 on the first transparent conductive layer 131 is located within an orthogonal projection of the black matrix 12; an orthogonal projection cast by the second touch detection line 142 on the second transparent conductive layer 141 is located with an orthogonal projection of the black matrix 12. Specifically, since metals are not light transmitting, the first touch detection line 132 and the second touch detection line 142 that are both located on the grid like black matrix 12 arranged among the open areas 11 do not block the open areas, so as not to affect aperture ratio.

Further, the first touch detection line 132 is arranged to extend in a row-wise direction of the open areas 11 and the second touch detection line 142 is arranged to extend along a column-wise direction of the open areas 11; or alternatively, the second touch detection line 142 is arranged to extend in the row-wise direction of the open areas 11 and the first touch detection line 132 is arranged to extend in the column-wise direction of the open areas 11. In both arrangements, the first touch detection line 132 and the second touch detection line 142 are stacked on and intersecting each other in such a way as to be isolated from each other by the insulation layer 15 without engaging each other. In other words, the first touch detection line 132 and the second touch detection line 142 are arranged in a grid form. In the instant embodiment, the first touch detection line 132 extends in the row-wise of the open areas 11 and the second touch detection line 142 extends in the column-wise direction of the open areas 11.

Further, the first touch detection line 132 can be a transmitting line or a receiving line and is connected to a driving circuit of the touch panel. The first touch detection line 132 and the first transparent conductive layer 131 generate capacitive detection and serve as a capacitive sensor of the first capacitive touch layer 13 of the touch panel to achieve touch control of the touch panel so as to achieve receiving or transmitting of a signal. In the instant embodiment, the first touch detection line 132 is a transmitting line.

Further, the second touch detection line 142 can be a transmitting line or a receiving line and is connected to a driving circuit of the touch pan. The second touch detection line 142 and the second transparent conductive layer 141 generate capacitive detection and serve as a capacitive sensor of the second capacitive touch layer 14 of the touch panel to achieve touch control of the touch panel so as to achieve transmitting or receiving of a signal. In the instant embodiment, the first touch detection line 132 is a transmitting line and the second touch detection line 142 is a receiving line corresponding thereto.

The touch panel provided in the present invention is applicable to liquid crystal display panels of various modes, such as being applicable to in-plane switch (ISP) and advanced supper dimension switch (ADS) liquid crystal display panel that achieve wide view angles and also being applicable to the traditional twisted nematic (TN) liquid crystal display panels, no limitation being cast in this respect herein.

The present invention provides a capacitive in-cell touch panel, which comprises two capacitive sensors at a touch site, namely the stacked and intersecting first capacitive touch layer 13 and second capacitive touch layer 14, where each layer of capacitive sensor achieves a touch control operation by establishing capacitive coupling between a conductive layer and a signal line to generate a voltage signal. Due to the two-layered arrangement, touch sensitivity is enhanced. Further, the transmitting line and the receiving line of each layer is arranged on the black matrix or has an orthogonal projection exactly located on the black matrix so as to avoid blocking of an open area that affects aperture ratio.

The present invention also protects a display device. The display device comprises the above-described capacitive in-cell touch panel.

The capacitive in-cell touch panel of the present invention can be manufactured with a known process that is generally applied to manufacture a touch panel. It is, however, noted here that the manufacture of the first capacitive touch layer 13 and the second capacitive touch layer 14 is that an organic light shielding layer is first coated on a glass substrate and the organic light shielding layer is subjected to exposure and development to form a black matrix (BM) structure; physical vapor deposition is applied to form a first transparent conductive oxide layer ITO1 and a first metal layer M1; then a photo sensitive material is coated. Through exposure and development applied in combination with the first transparent conductive oxide layer and the first metal layer, second etching is applied to the first metal layer to eventually form the structure of ITO1 and M1, namely the first touch detection line 132 and the first transparent conductive layer 131.

Then, an organic insulation layer is coated on areas except touch control IC bonding areas, which is the insulation layer 15, and then the same process described above is adopted to form the second touch detection line 142 and the second transparent conductive layer 141. Finally, following the commonly used prior art processes of manufacturing touch panels, operations of RGB photoresist coating, exposure, and development are performed sequentially to form RGB photoresist arrangement. After the completion of RGB, an organic planarization layer is coated on areas except the touch control IC bonding areas. Then, PVD is applied to deposit a layer of COM ITO, and then operations of coating, exposure, and development are applied to form ITO terminal structures in the touch control IC bonding areas.

Disclosed above are only the preferred embodiments of the present invention. It is appreciated that those having ordinary skills of the art may readily appreciate various improvements and modifications without departing from the principle of the present invention and these improvements and modifications are considered within the protection scope of the present invention.

What is claimed is:

1. A capacitive in-cell touch panel, comprising a substrate and a black matrix disposed on the substrate, wherein the capacitive in-cell touch panel further comprises a first capacitive touch layer, an insulation layer, and a second capacitive touch layer, the first capacitive touch layer being formed on the black matrix, the insulation layer being formed on the first capacitive touch layer, the second capacitive touch layer being formed on the insulation layer to be stacked on and intersecting the first capacitive touch layer in a grid form;

wherein the first capacitive touch layer comprises a first transparent conductive layer and a first touch detection line directly formed on top of the first transparent conductive layer, the first transparent conductive layer being formed on the black matrix such that two side portions of the first transparent conductive layer respectively and transversely extend beyond two opposite sidewalls of the black matrix, the first touch detection line being formed on the first transparent conductive layer such that the first touch detection line casts an orthogonal projection directly on the first transparent conductive layer that is located within an orthogonal projection of the black matrix;

wherein the second capacitive touch layer, which is different from the first conductive touch layer, comprises a second transparent conductive layer and a second detection line directly formed on top of the second transparent conductive layer, the second transparent conductive layer being formed on the insulation layer and having an orthogonal projection cast directly on the black matrix, the second touch detection line being formed on the second transparent conductive layer;

wherein the first transparent conductive layer and the first touch detection line collectively form a first pair of transmitting line and receiving line and the second transparent conductive layer and the second detection line collectively form a second pair of transmitting line and receiving line, wherein the transmitting line and the receiving line of each of the first and second pairs are operable to establish capacitive coupling therebetween to generate a voltage signal, such that the first and second pairs of transmitting line and receiving line are respectively operable as two touch capacitive sensors, which generate two voltage signals respectively; and wherein the first touch detection line extends in a row-wise direction of open areas and the second touch detection line extends in a column-wise direction of the open areas and the first touch detection line and the second touch detection line are stacked on and intersect each other without engaging each other.

2. The capacitive in-cell touch panel as claimed in claim 1, wherein the insulation layer is set on and covers the first touch detection line and a portion of the first transparent conductive layer not covered by the first touch detection line.

3. The capacitive in-cell touch panel as claimed in claim 2, wherein the second touch detection line casts an orthogonal projection directly on the second transparent conductive layer that is within an orthogonal projection of the black matrix.

4. The capacitive in-cell touch panel as claimed in claim 3, wherein the second touch detection line extends in a row-wise direction of open areas and the first touch detection line extends in a column-wise direction of the open areas and the first touch detection line and the second touch detection line are stacked on and intersect each other without engaging each other.

5. The capacitive in-cell touch panel as claimed in claim 1, wherein the first touch detection line and the second touch detection line are made of metallic materials.

6. The capacitive in-cell touch panel as claimed in claim 2, wherein the first touch detection line and the second touch detection line are made of metallic materials.

7. A display device, comprising a capacitive in-cell touch panel, the capacitive in-cell touch panel comprising a substrate and a black matrix disposed on the substrate, wherein the capacitive in-cell touch panel further comprises a first capacitive touch layer, an insulation layer, and a second capacitive touch layer, the first capacitive touch layer being formed on the black matrix, the insulation layer being formed on the first capacitive touch layer, the second capacitive touch layer being formed on the insulation layer to be stacked on and intersecting the first capacitive touch layer in a grid form;

wherein the first capacitive touch layer comprises a first transparent conductive layer and a first touch detection line directly formed on top of the first transparent conductive layer, the first transparent conductive layer being formed on the black matrix such that two side portions of the first transparent conductive layer respectively and transversely extend beyond two opposite sidewalls of the black matrix, the first touch detection line being formed on the first transparent conductive layer such that the first touch detection line casts an orthogonal projection directly on the first transparent conductive layer that is located within an orthogonal projection of the black matrix;

wherein the second capacitive touch layer, which is different from the first conductive touch layer, comprises a second transparent conductive layer and a second detection line directly formed on top of the second transparent conductive layer, the second transparent conductive layer being formed on the insulation layer and having an orthogonal projection cast directly on the black matrix, the second touch detection line being formed on the second transparent conductive layer;

wherein the first transparent conductive layer and the first touch detection line collectively form a first pair of transmitting line and receiving line and the second transparent conductive layer and the second detection line collectively form a second pair of transmitting line and receiving line, wherein the transmitting line and the receiving line of each of the first and second pairs are operable to establish capacitive coupling therebetween to generate a voltage signal, such that the first and second pairs of transmitting line and receiving line are respectively operable as two touch capacitive sensors, which generate two voltage signals respectively; and wherein the first touch detection line extends in a row-wise direction of open areas and the second touch detection line extends in a column-wise direction of the open areas and the first touch detection line and the second touch detection line are stacked on and intersect each other without engaging each other.

8. The display device as claimed in claim 7, wherein the insulation layer is set on and covers the first touch detection line and a portion of the first transparent conductive layer not covered by the first touch detection line.

9. The display device as claimed in claim 7, wherein the second touch detection line casts an orthogonal projection directly on the second transparent conductive layer that is within an orthogonal projection of the black matrix.

10. The display device as claimed in claim 9, wherein the second touch detection line extends in a row-wise direction of open areas and the first touch detection line extends in a column-wise direction of the open areas and the first touch detection line and the second touch detection line are stacked on and intersect each other without engaging each other.

* * * * *